United States Patent [19]
Gregor

[11] Patent Number: 5,317,585
[45] Date of Patent: May 31, 1994

[54] LASER REFLECTING CAVITY WITH ASE SUPPRESSION AND HEAT REMOVAL

[75] Inventor: Eduard Gregor, Pacific Palisades, Calif.

[73] Assignee: Hughes Aircraft Company, Los Angeles, Calif.

[21] Appl. No.: 930,259

[22] Filed: Aug. 17, 1992

[51] Int. Cl.$^5$ .................... H01S 3/045; H01S 3/094
[52] U.S. Cl. ........................................ 372/35; 372/75
[58] Field of Search ...................... 372/34, 35, 75, 70

[56] References Cited

U.S. PATENT DOCUMENTS

| | | | |
|---|---|---|---|
| 3,821,663 | 6/1974 | Brenner | 372/25 |
| 4,563,763 | 1/1986 | Kuhn | 372/35 |
| 4,858,242 | 8/1989 | Kuper et al. | 372/34 |
| 4,881,233 | 11/1989 | von Arb et al. | 372/35 |
| 4,969,155 | 11/1990 | Kahan | 372/75 |

*Primary Examiner*—James W. Davie
*Attorney, Agent, or Firm*—Michael W. Sales; Wanda K. Denson-Low

[57] ABSTRACT

A thermally conducting reflecting envelope for use in laser cavities, and laser apparatus employing such envelopes. A transparent heat conducting member, such as sapphire, surrounds a laser medium and has a transmissive coating thereon that transmits pump light provided by a pump light source onto the laser medium. The coating reflects the diode pump light and transmits laser light to suppress ASE that causes clamping of the laser output at a relatively low level. An absorbing elastic material is disposed on the dielectric coating and is adapted to absorb the laser light. Heat sinks are disposed in contact with the absorbing elastic material, and conducts heat away from the laser medium. A light entrance window or area is antireflection coated to transmit the pump light onto the laser medium. A liquid cooled version further includes a liquid cooling channel disposed between the laser medium and the thermally conducting member. Two slab lasers are also disclosed employing the present thermally conducting reflecting envelope. The present invention provides more efficient cooling and a more effective ASE suppression than conventional Samarium glass filters in solid state lasers pumped by flashlamps or laser diodes. The present invention provides for efficient heat conduction and removal from a laser medium, efficient transmission and absorption of laser light to suppress ASE, and efficient transmission of pump light to the laser medium.

19 Claims, 3 Drawing Sheets

LASER REFLECTING CAVITY WITH ASE SUPPRESSION AND HEAT REMOVAL

BACKGROUND

The present invention relates generally to lasers, and more particularly, to a laser reflecting cavity that provides for the suppression of amplified stimulated emission (ASE) and improved heat removal.

The prior art related to the present invention is described in U.S. Pat. No. 4,969,155 which is assigned to the assignee of the present invention, and which discloses an integrating laser diode pumped cavity. The suppression of amplified stimulated emission (ASE) is especially important for Nd:YAG based laser designator systems to optimize energy output in a compact size. Although the laser disclosed in the above-cited patent works well, one disadvantage of the approach taken in this patent is seen in the use of Samarium glass to suppresses ASE and to increase energy storage in the laser. Samarium glass has a very low thermal conductivity and has limited absorption at 1.06 μm light wavelength, thus limiting laser performance. The use of Samarium glass reduces the contact area between a sapphire envelope and a metal heat sink, thus reducing heat transfer and limiting the pulse repetition rate of the laser. With a less efficient heat removal scheme, the temperature of the laser rod is significantly increased which reduces overall laser efficiency.

Therefore, it is an objective of the present invention to provide for a laser reflecting cavity that provides for the suppression of amplified stimulated emission (ASE) and improved heat removal.

SUMMARY OF THE INVENTION

In order to achieve the above and other objectives, the present invention provides for a thermally conducting reflecting envelope for use in laser cavities, and laser apparatus employing such envelopes. The basic apparatus of the present invention is an envelope comprised of a transparent heat conducting member, such as sapphire, surrounding a laser medium (rod, slab, or other medium geometry). The transparent heat conducting member has an optically transmitting coating disposed thereon that transmits diode light pumping energy (pump light) provided by a diode pump light source that is transmitted into the laser medium. The coating reflects the diode pump light (800 nm for a typical diode array) and transmits laser light (1.06 μm for a Nd:YAG laser medium) to suppress amplified stimulated emission that normally causes clamping of the laser output at a lower level than is desired. This coating provides the same but improved function as a Samarium glass tube or slabs employed in in the above-cited U.S. patent, when combined with a specular or defuse reflector.

An absorbing elastic material is disposed on the outer surface of the member and around the dielectric coating and is adapted to absorb 1.06 μm wavelength energy, for example, when used with a Nd:YAG laser medium, for example. Heat sinks are disposed in contact with the absorbing elastic material that conduct heat away from the laser medium to a housing. A light entrance window or area is antireflection coated to transmit the pump light into the interior of the envelope and onto the laser medium.

A variety of laser apparatus may employ the concepts of the present invention including those laser apparatus using rod and slab laser media. In addition, a liquid cooled version of laser apparatus further includes a liquid cooling channel disposed between the laser medium and the conducting member. A slab laser apparatus comprises a laser medium sandwiched between two layers of transparent elastic material that contact two sapphire conducting members that form an envelope surrounding the laser medium. An air gap is disposed around the lateral edges of the laser medium to allow for expansion. One conducting member is antireflection coated for optimal transmission the pump light while a second conducting member is dielectric coated to provide reflectance for 800 nm pump light and transmission for 1.06 μm laser light. The laser diode array is disposed adjacent the antireflection coated conducting member and an elastic absorber is disposed on a surface of the second conducting member opposite the diode pump array. Heat sinks are coupled to the conducting members and the elastic absorber to conduct heat away from the laser medium.

The present invention significantly simplifies the integrating laser diode pumped cavity disclosed in U.S. Pat. No. 4,969,155, improves the heat removal properties in its conductively cooled embodiment, and provides greater suppression of ASE which is particularly important for laser designator application where Nd:YAG (1.06 μm) based laser rods are used. The present invention provides a competitive baseline design for several diode pumped lasers currently under development by the assignee of the present invention. For example, one presently designed and demonstrated diode pumped laser used on the Solid State Laser Radar System (SSLRS) program for the U.S. Air Force is readily modified by employing the present novel sapphire reflecting envelope in the laser design, thus creating a laser that can be used either with Nd:YLF, as has been used previously, and with Nd:YAG as is generally desired for laser designator applications.

The present invention provides more efficient cooling and a more effective ASE suppression than the conventional use of Samarium glass filters in solid state lasers such as Nd:YAG, and the like, pumped by flashlamps or laser diodes. The present invention thus provides an improved component that is used in a laser and which provides for efficient heat conduction/removal from laser rod or slab, reflection of pump light, diode laser pump or flashlamp, transmission and absorption of laser light to suppress ASE, and a means to efficiently transmit pump light at the entrance to the laser rod derived from diode pump arrays.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
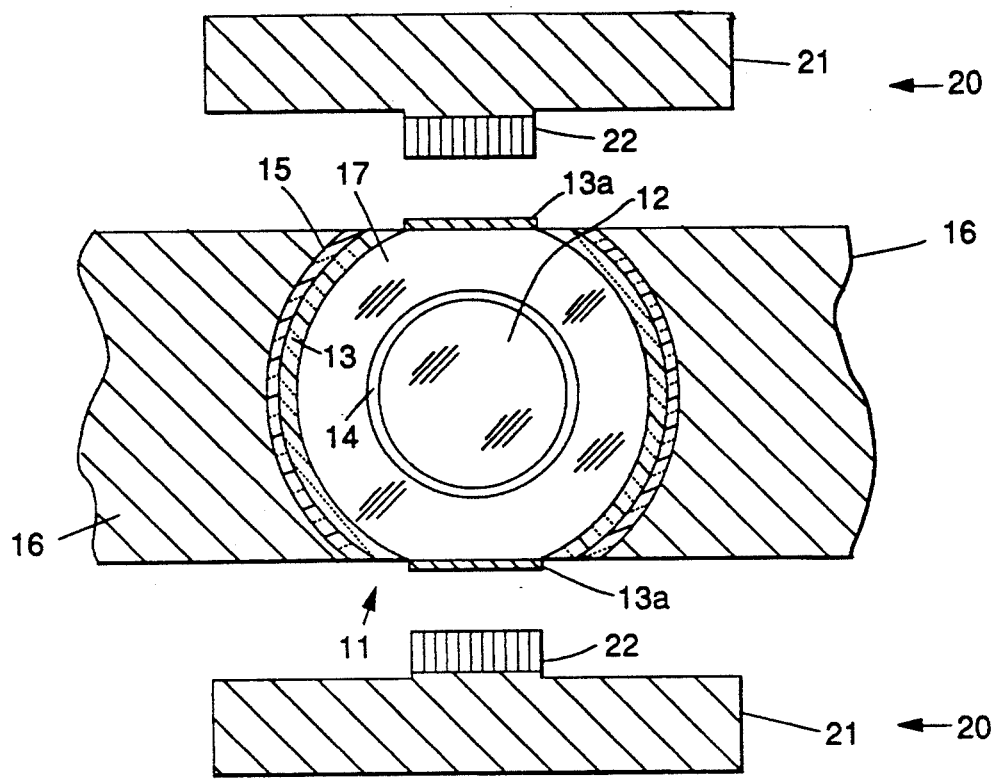
FIG. 1 shows a laser head employing a laser reflecting envelope that provides for the suppression of amplified stimulated emission (ASE) and improved heat removal in accordance with the principles of the present invention.
Figure 2:
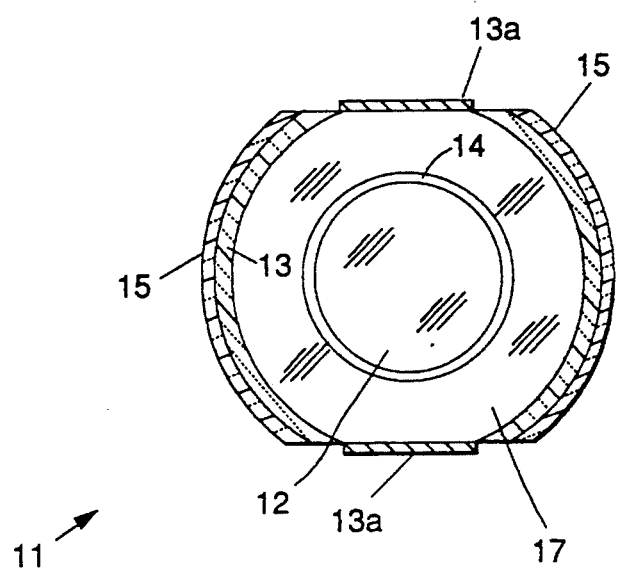
FIG. 2 shows the laser reflecting envelope of FIG. 1.

Referring to the drawing figures, FIG. 1 shows a diagram of a thermally conducting reflecting envelope 11 for use in laser cavities, and laser apparatus 10 employing such envelopes. More specifically, FIG. 1 shows a laser apparatus 10 employing the laser reflecting envelope 11 that provides for the suppression of amplified stimulated emission (ASE) and improved heat removal in accordance with the principles of the present invention. FIG. 2 shows the details of the laser reflecting envelope 11 of FIG. 1.

The basic thermally conducting reflecting envelope 11 of the present invention comprises a transparent heat conducting member 17, such as sapphire, for example, disposed around a laser medium 12 (rod, slab, or other medium geometry). A relatively small air gap 14, or layer of elastic material 14 that is transparent to pump light, may be provided between the laser medium 12 and the transparent heat conducting member 17. The air gap 14 or elastic material 14 is provided for heat transfer purposes and does not induce any stress on the laser medium 12. The transparent heat conducting member 17 has an optically transmitting coating 13 disposed around its periphery. A plurality of portions of the coating 13 comprise entrance windows 13a and are disposed on relatively flat portions of the transparent heat conducting member 17. The entrance windows 13a transmit diode light pumping energy (or pump light) provided by diode pump light sources 20 or diode arrays 20 into the laser medium 12.

The diode arrays 20 are comprised of a housing 21 that secure a plurality of light emitting laser diodes 22. The coating 13 reflects diode pump light (800 nm for typical diode arrays 20) and transmits laser light (1.06 $\mu$m for a Nd:YAG laser medium 11) for example. The coating 13 acts to suppress amplified stimulated emission (ASE) that normally causes clamping of the output of the laser apparatus 10 at a lower level than is desired. The coating 13 provides the same but improved function as a Samarium glass tube or slabs employed in in the above-cited U.S. patent, when such elements are combined with a specular or defuse reflector.

An absorbing elastic material 15 is disposed on the outer surface of the envelope 11 and is adapted to absorb 1.06 $\mu$m wavelength energy, for example, when used with a Nd:YAG laser medium 12, for example. Heat sinks 16 (typically aluminum or other thermally conductive material) are disposed in contact with the absorbing elastic material 15 and hence the transparent heat conducting member 17, and conduct heat away from the laser medium 12 to a housing (not shown).

Figure 3:
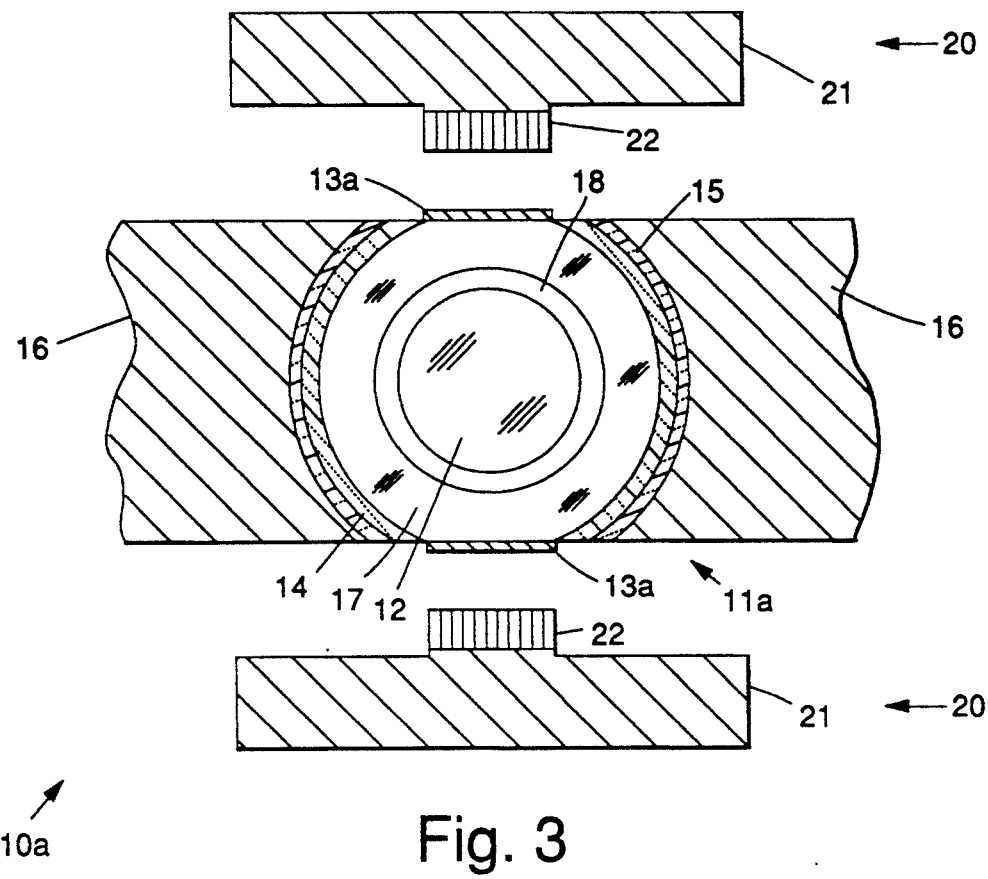
FIG. 3 shows the laser reflecting envelope of FIG. 2 adapted for use in a liquid cooled laser head.

A variety of laser apparatus 10 may employ the thermally conducting reflecting envelope 11 of the present invention including those laser apparatus 10 using rod and slab laser media 11. Referring to FIG. 3, a liquid cooled version of laser apparatus 10 (shown in FIG. 3 as laser apparatus 10a) adapts the envelope 11 of the present invention to a liquid cooled laser. More particularly, FIG. 3 shows the thermally conducting reflecting envelope 11 of FIG. 2 adapted for use in a liquid cooled laser head, identified as thermally conducting reflecting envelope 11a or a liquid interface sapphire coated envelope 11a. The thermally conducting reflecting envelope 11 used in the laser apparatus 10a further includes a liquid cooling channel 18 disposed between the laser medium 12 and the transparent heat conducting member 17. The balance of the components described with reference to FIGS. 1 and 2 are the same in this laser apparatus 10a.

As is illustrated in FIG. 3, the concepts of the present invention may be applied to liquid cooled lasers wherein a conventional Samarium glass tube such as is disclosed in U.S. Pat. No. 4,969,155 is replaced with the sapphire envelope 11 described herein. The advantages of using the liquid interface sapphire coated envelope 11a compared to using a Samarium glass tube are that the liquid interface sapphire coated envelope 11a provides for lower flow rates, and in the extreme, stagnant liquid, as is shown in FIG. 3. More specifically, a stagnant liquid or no flow liquid laser design is used in one flashlamp pumped laser developed by the assignee of the present invention that operates at pulse repetition rates up to 4 Hz using a Samarium glass flow tube. With the use of the present sapphire envelope, a thinner liquid interface, and diode pumping, the pulse rate of this laser exceeds 20 Hz.

Figure 4:
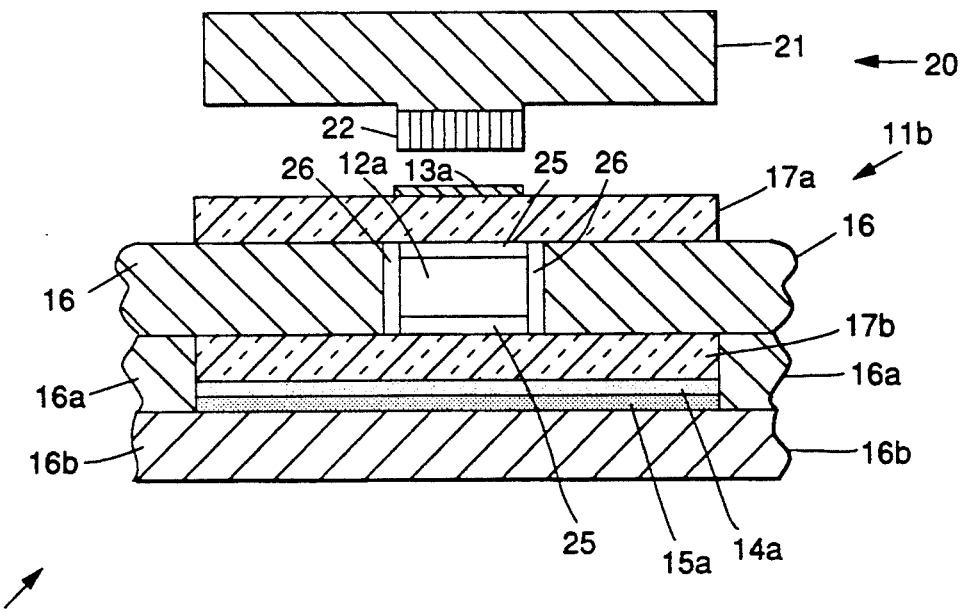
FIG. 4 shows a slab laser geometry employing a modified laser reflecting envelope of FIG. 2.

Referring to FIG. 4, a slab laser apparatus 30 employing a modified version of the envelope 11 of the present invention (identified in FIG. 4 as envelope 11b) comprises a laser medium 12a sandwiched between two layers of transparent elastic material 25 that contact two transparent heat conducting members 17a, 17b, such as sapphire conducting layers 17, for example, that form the envelope 11b surrounding the laser medium 12a. An air gap 26 is disposed around the lateral edges of the laser medium 12a to allow for thermal expansion. A first sapphire layer 17a is antireflection coated (coating comprising entrance window 13a) for optimal transmission the diode light pumping energy while a second sapphire layer 17b is dielectric coated (dielectric coating 14a) to provide high reflectance for 800 nm diode light pumping energy and high transmission for 1.06 $\mu$m laser light. A laser diode array 20 is disposed adjacent an entrance window 13 and an elastic absorber 15a for 1.06 $\mu$m energy is disposed on a surface of the second sapphire layer 17b opposite the diode pump array 20. Heat sinks 16, 16a, 16b are coupled to the envelope 11b, and the elastic absorber 15a to conduct heat away from the laser medium 12a to a housing (not shown). The second transparent heat conducting members 17b, or sapphire layer 17b has the dielectric coating disposed thereon adjacent the elastic absorber 15a.

Figure 5:
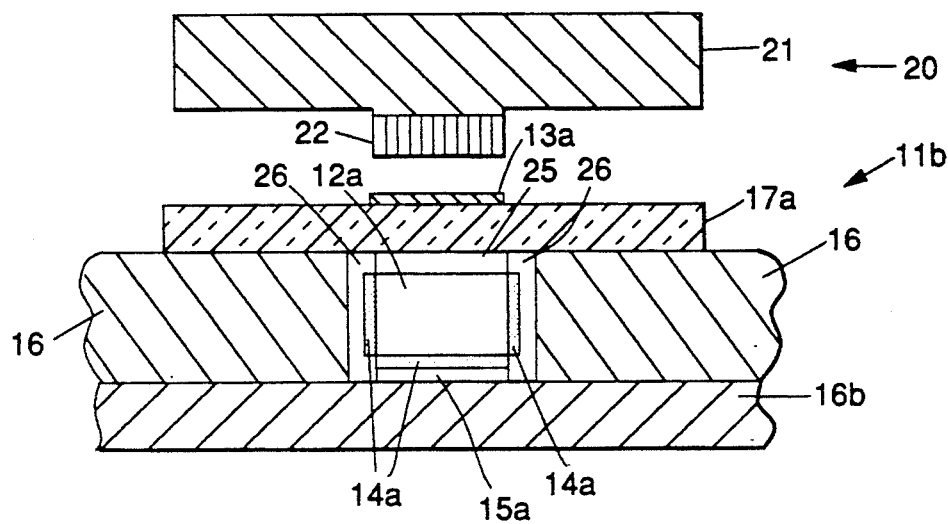
FIG. 5 shows a variation of the slab laser geometry of FIG. 4.

FIG. 5 shows a variation of the slab laser apparatus 30 of FIG. 4 identified as slab laser apparatus 30a. The slab laser apparatus 30a modifies the slab laser apparatus 30 by disposing the dielectric coating 14a around the peripheral edges of the slab laser medium 12a, except on the side adjacent the entrance window 13a, and eliminating one transparent heat conducting member 17b, its dielectric coating 14a, and the elastic absorber 15a. The heat sink 16b is moved adjacent heat sinks 16 disposed on the lateral sides of the slab laser medium 12a. The balance of this design is substantially the same as the apparatus 30 of FIG. 4.

The present invention is primarily adapted for use with solid state lasers and specifically provides an improved cavity for use in diode pumped solid state lasers. The present apparatus 10 provides for a novel laser head design using the highly thermally conducting transparent sapphire envelope 11 having special purpose dielectric coatings 14 disposed thereon to substantially extend energy and pulse repetition performance of the laser head. The conductive transparent envelope 11 with the dielectric coatings 13, 14 that provide for the transmission of diode pump light at the diode pump light entrance window 13, and high reflectivity of the diode pump light inside the envelope 11, while providing relatively good (50–95%) transmission for the remaining area of the envelope 11 at the laser wavelength (1.06 μm).

The present invention significantly simplifies the integrating laser diode pumped cavity disclosed in U.S. Pat. No. 4,969,155, improves the heat removal properties in its conductively cooled embodiment, and provides greater suppression of ASE, which is particularly important for laser designator application where Nd:YAG (1.06 μm) based laser rods are used. The present invention provides a competitive baseline design for several diode pumped lasers currently under development by the assignee of the present invention. For example, one presently designed and demonstrated diode pumped laser used on the Solid State Laser Radar System (SSLRS) program for the U.S. Air Force is readily modified by employing the present novel sapphire reflecting envelope 11 in the laser design, thus creating a laser that can be used either with Nd:YLF, as has been used previously, and with Nd:YAG as is generally desired for laser designator applications.

The present invention provides more efficient cooling and a more effective ASE suppression than the conventional use of Samarium glass filters in solid state lasers such as Nd:YAG, and the like, pumped by flashlamps or laser diodes. The present invention thus provides an improved component that may be used in a laser, and laser apparatus employing such a component, and which provides for efficient heat conduction removal from the laser medium 12, reflection of pump light provided by a diode laser pump or flashlamp, transmission and absorption of laser light to suppress ASE, and a means to efficiently transmit pump light at the entrance window 13 to the laser medium 12 provided by the diode pump arrays 20.

Thus there has been described a new and improved laser reflecting cavity that provides for the suppression of amplified stimulated emission and improved heat removal. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. Laser apparatus comprising:
   a laser medium adapted to provide laser light;
   a pump light source for providing pump light to said laser medium;
   a thermally conducting transparent member disposed adjacent to said laser medium and having an entrance window disposed adjacent said pump light source;
   an optically transmitting antireflecting coating disposed on said thermally conducting transparent member that transmits said pump light provided by said pump light source that is transmitted to said laser medium through said entrance window of said thermally conducting transparent member;
   a dielectric coating disposed on said thermally conducting transparent member that reflects said pump light and transmits said laser light to suppress amplified stimulated emission;
   an absorbing elastic material disposed on the outer surface of said thermally conducting transparent member around said dielectric coating that is adapted to absorb said laser light; and
   a heat sink disposed in contact with said absorbing elastic material to conduct heat away from said laser medium.

2. The laser apparatus of claim 1 wherein said thermally conducting transparent member is comprised of sapphire.

3. The laser apparatus of claim 1 wherein said laser medium comprises a laser rod.

4. The laser apparatus of claim 1 wherein said laser medium comprises a laser slab.

5. The laser apparatus of claim 1 wherein said laser medium comprises a Nd:YAG laser medium and wherein said dielectric coating is adapted to reflect 800 nm pump light and transmit 1.06 μm laser light.

6. The laser apparatus of claim 1 wherein said entrance window has an antireflection coating disposed thereon that is adapted to transmit said pump light through said thermally conducting transparent member and onto said laser medium.

7. The laser apparatus of claim 1 further comprising a liquid cooling channel disposed between said laser medium and said thermally conducting transparent member.

8. The laser apparatus of claim 1 further comprising an air gap disposed between said laser medium and said thermally conducting transparent member.

9. The laser apparatus of claim 1 further comprising an elastic member disposed between said laser medium and said thermally conducting transparent member.

10. Laser apparatus comprising:
    a laser medium adapted to provide laser light;
    a pump light source for providing pump light to said laser medium;
    a thermally conducting transparent member disposed adjacent to said laser medium and having an entrance window disposed adjacent said pump light source;
    a liquid cooling channel disposed between said laser medium and said thermally conducting transparent member;
    an optically transmitting antireflecting coating disposed on said thermally conducting transparent member that transmits said pump light provided by said pump light source that is transmitted to said laser medium through said entrance window of said thermally conducting transparent member;
    a dielectric coating disposed on said thermally conducting transparent member that reflects said pump light and transmits said laser light to suppress amplified stimulated emission;
    an absorbing elastic material disposed on the outer surface of said thermally conducting transparent member around said dielectric coating that is adapted to absorb said laser light; and
    a heat sink disposed in contact with said absorbing elastic material to conduct heat away from said laser medium.

11. The laser apparatus of claim 10 wherein said thermally conducting transparent member is comprised of sapphire.

12. The laser apparatus of claim 10 wherein said laser medium comprises a laser rod.

13. The laser apparatus of claim 10 wherein said laser medium comprises a laser slab.

14. The laser apparatus of claim 10 wherein said laser medium comprises a Nd:YAG laser medium and wherein said dielectric coating is adapted to reflect 800 nm pump light and transmit 1.06 μm laser light.

15. The laser apparatus of claim 10 wherein said entrance window has an antireflection coating disposed thereon that is adapted to transmit said pump light through said thermally conducting transparent member and onto said laser medium.

16. Laser apparatus comprising:
a pump light source;
a laser medium;
two layers of transparent elastic material disposed on opposite surfaces of said laser medium.
an air gap disposed around the lateral edges of said laser medium sufficient to provide for heat transfer;
a thermally conducting transparent member disposed between a first layer of said transparent elastic material and said pump light source;
a heat sink disposed around the periphery of said laser medium and coupled to said thermally conducting transparent member to conduct heat away from said laser medium; and
a dielectric coating disposed around a predetermined portion of the periphery of said laser medium.

17. The laser apparatus of claim 16 wherein said thermally conducting transparent member is comprised of sapphire.

18. The laser apparatus of claim 16 further comprising:
first and second thermally conducting transparent members respectively disposed in contact with said two layers of transparent elastic material to form a sandwich structure, wherein said first thermally conducting transparent member is disposed adjacent said pump light source and has an antireflection coating disposed thereon, and wherein said second thermally conducting transparent member has a dielectric coating to provide reflectance of said pump light and transmission of said laser light; and
an absorbing elastic material disposed on an outer surface of said second thermally conducting transparent member opposite from said pump light source that is adapted to absorb said laser light.

19. The laser apparatus of claim 16 wherein said laser medium comprises a Nd:YAG laser medium and wherein said dielectric coating is adapted to reflect 800 nm pump light and transmit 1.06 μm laser light.

* * * * *